United States Patent
Wetzel

(10) Patent No.: US 11,577,709 B2
(45) Date of Patent: Feb. 14, 2023

(54) HYDRAULIC ASSEMBLY OF A TRACTION CONTROL SYSTEM OF A VEHICLE BRAKE SYSTEM HAVING TWO SEPARATE CONTROL UNITS

(71) Applicant: Robert Bosch GmbH, Stuttgart (DE)

(72) Inventor: Gerhard Wetzel, Korntal-Muenchingen (DE)

(73) Assignee: Robert Bosch GmbH, Stuttgart (DE)

(*) Notice: Subject to any disclaimer, the term of this patent is extended or adjusted under 35 U.S.C. 154(b) by 490 days.

(21) Appl. No.: 16/608,725

(22) PCT Filed: Mar. 22, 2018

(86) PCT No.: PCT/EP2018/057302
§ 371 (c)(1),
(2) Date: Oct. 25, 2019

(87) PCT Pub. No.: WO2018/210472
PCT Pub. Date: Nov. 22, 2018

(65) Prior Publication Data
US 2021/0094524 A1 Apr. 1, 2021

(30) Foreign Application Priority Data
May 18, 2017 (DE) ...................... 10 2017 208 390.5

(51) Int. Cl.
*B60T 13/66* (2006.01)
*H02K 11/33* (2016.01)
(Continued)

(52) U.S. Cl.
CPC ............ *B60T 13/662* (2013.01); *B60T 13/20* (2013.01); *B60T 13/686* (2013.01);
(Continued)

(58) Field of Classification Search
CPC ...... B60T 13/662; B60T 13/20; B60T 13/686; B60T 17/02; B60T 15/028;
(Continued)

(56) References Cited

U.S. PATENT DOCUMENTS 5,688,028 A * 11/1997 Kohno ................... B60T 8/368
303/119.2
5,986,368 A * 11/1999 Wetzel .................. H02K 5/225
310/71

(Continued)

FOREIGN PATENT DOCUMENTS

DE 195 18 518 C1 8/1996
DE 10 2006 059 924 A1 6/2008
(Continued)

OTHER PUBLICATIONS

International Search Report corresponding to PCT Application No. PCT/EP2018/057302, dated Jul. 30, 2018 German and English language document) (7 pages).

*Primary Examiner* — Pamela Rodriguez
(74) *Attorney, Agent, or Firm* — Maginot, Moore & Beck LLP

(57) ABSTRACT

A hydraulic assembly of a traction control system of a hydraulic vehicle brake system includes a hydraulic block, a motor block, and a control device. The hydraulic block includes at least one electric hydraulic valve and at least one electric hydraulic pump arranged therein. The motor block includes an electric motor arranged therein. The electric motor is configured to drive the at least one hydraulic pump. The control device is configured to control the at least one hydraulic valve, the at least one hydraulic pump, and the electric motor. The control device has two structurally separate control units, which include a first control unit with signal components and a second control unit with power components.

13 Claims, 2 Drawing Sheets

(51) Int. Cl.

| | |
|---|---|
| *H02K 9/22* | (2006.01) |
| *B60T 13/20* | (2006.01) |
| *B60T 13/68* | (2006.01) |
| *B60T 15/02* | (2006.01) |
| *B60T 17/02* | (2006.01) |
| *F15B 21/08* | (2006.01) |
| *H02K 5/22* | (2006.01) |
| *H02K 7/08* | (2006.01) |
| *H02K 11/02* | (2016.01) |

(52) U.S. Cl.
CPC ............ *B60T 15/028* (2013.01); *B60T 17/02* (2013.01); *F15B 21/08* (2013.01); *H02K 5/225* (2013.01); *H02K 7/083* (2013.01); *H02K 9/223* (2021.01); *H02K 11/02* (2013.01); *H02K 11/33* (2016.01); *B60T 2270/10* (2013.01); *B60T 2270/402* (2013.01); *H02K 2211/03* (2013.01)

(58) Field of Classification Search
CPC ........... B60T 2270/402; B60T 2270/10; F15B 21/08; H02K 2211/03; H02K 7/083; H02K 9/223; H02K 11/02; H02K 11/33; H02K 5/225
See application file for complete search history.

(56) References Cited

U.S. PATENT DOCUMENTS

| | | | | |
|---|---|---|---|---|
| 6,208,048 | B1* | 3/2001 | Deynet | B60T 8/368 |
| | | | | 310/71 |
| 6,550,873 | B1* | 4/2003 | Hengler | B60T 8/368 |
| | | | | 310/71 |
| 6,945,757 | B2* | 9/2005 | Hartel | F04B 53/22 |
| | | | | 417/415 |
| 2004/0075352 | A1 | 4/2004 | Hartel et al. | |
| 2005/0265852 | A1* | 12/2005 | Nakazawa | B60T 8/368 |
| | | | | 417/63 |
| 2008/0036291 | A1 | 2/2008 | Sakai | |
| 2008/0174192 | A1* | 7/2008 | Dinkel | B60T 8/368 |
| | | | | 310/90 |
| 2009/0189440 | A1* | 7/2009 | Abe | B60T 8/321 |
| | | | | 303/114.1 |

FOREIGN PATENT DOCUMENTS

| | | |
|---|---|---|
| DE | 10 2009 000 301 A1 | 7/2009 |
| JP | 2008-044457 A | 2/2008 |
| JP | 2009-196627 A | 9/2009 |
| WO | 00/51863 A1 | 9/2000 |
| WO | 02/057125 A1 | 7/2002 |
| WO | 2018/054863 A1 | 3/2018 |

\* cited by examiner

HYDRAULIC ASSEMBLY OF A TRACTION CONTROL SYSTEM OF A VEHICLE BRAKE SYSTEM HAVING TWO SEPARATE CONTROL UNITS

This application is a 35 U.S.C. § 371 National Stage Application of PCT/EP2018/057302, filed on Mar. 22, 2018, which claims the benefit of priority to Serial No. DE 10 2017 208 390.5, filed on May 18, 2017 in Germany, the disclosures of which are incorporated herein by reference in their entirety.

BACKGROUND

The disclosure relates to a hydraulic assembly of a traction control system of a hydraulic vehicle brake system, having a hydraulic block in which at least one electric hydraulic valve and at least one electric hydraulic pump are arranged, a motor block in which an electric motor for driving the at least one hydraulic pump is arranged, and a control apparatus for controlling the at least one hydraulic valve, the at least one hydraulic pump and the electric motor.

Traction control system are used in the case of vehicles, in particular in the case of motor vehicles such as motorcycles, cars or heavy goods vehicles as anti-wheel locking, drive slip and/or driving dynamics control. The core of such traction control systems is a hydraulic assembly which has a hydraulic block which is fitted with hydraulic components of the traction control system and is connected by brake lines to a main brake cylinder and to which one or more hydraulic wheel brakes are connected by brake lines. Here, hydraulic components are solenoid valves or electric hydraulic valves, hydropumps or hydraulic pumps (usually configured as piston pumps) as well as check valves, hydraulic accumulators, damper chambers and pressure sensors. The hydraulic block is typically a cube-shaped metal block which serves the purpose of mechanical fastening and hydraulic wiring of the hydraulic components of the traction control system.

The term wiring here refers to a hydraulic connection of the hydraulic components in accordance with a hydraulic circuit diagram of the traction control system.

While the hydraulic pumps are normally fully incorporated in receivers in the hydraulic block, of the hydraulic valves, usually only a hydraulic part is incorporated in an associated receiver of the hydraulic block. What is known as the electromagnetic part of the hydraulic valve, in particular, its coil, is arranged on the outside on the hydraulic block.

Published patent application DE 10 2006 059 924 A1 discloses a cube-shaped hydraulic block for a hydraulic assembly of a traction control system, in the case of which all the receivers for solenoid valves are arranged in one valve side of the hydraulic block. A first circuit board for controlling the functions of the hydraulic valves and the associated hydraulic pumps is fitted externally on the coils of the hydraulic valves. An electric motor is fitted on the outside as a motor block on the opposite side of the hydraulic block, what is known as the motor side.

SUMMARY

According to the disclosure, a hydraulic assembly of a traction control system of a hydraulic vehicle brake system is created, having a hydraulic block in which at least one electric hydraulic valve and at least one electric hydraulic pump are arranged, having a motor block in which an electric motor for driving the at least one hydraulic pump is arranged, and having a control apparatus for controlling the at least one hydraulic valve, the at least one hydraulic pump and the electric motor. The control apparatus is configured with two spatially separated or structurally separate control units, a first control unit with signal components and a second control unit with power components.

With the separation according to the disclosure of the control apparatus into two separate, divided control units, it is possible to configure the cableways from a plug of the hydraulic assembly to the motor block and from the motor block to the plug to be particularly short. A short electrical connection of the electric motor is thus advantageously possible.

Power components which are particularly advantageously cooled there are furthermore arranged according to the disclosure on the first control unit. Cooling is possible in particular both via the hydraulic block and the hydraulic fluid flowing through there as well as via the comparatively large surface of the motor block. It is thus also possible with the solution according to the disclosure to optimize the layout of circuit boards both of the first and the second control unit.

The second control unit is preferably arranged between the motor block and the hydraulic block. Such an arrangement is particularly advantageous precisely in terms of the above-mentioned short cabling to the electric motor and the then possible cooling of the power components.

The electric motor according to the disclosure is preferably formed at particularly low-cost as a brush motor. At least one brush of the electric motor is then advantageously arranged in the second control unit, in particular directly on a circuit board there. A compact design which can be produced at low cost is thus realized. A motor sensor can furthermore advantageously also be arranged on the circuit board. The motor sensor is then located in the immediate vicinity of a rotor of the associated electric motor. The angle position of the rotor and/or its rotational speed is advantageously measured with the motor sensor. At least one motor contact can furthermore also advantageously be arranged directly on the circuit board, in particular in the region of the motor block. The motor contact serves the purpose of contacting the electric motor and is preferably formed by means of a metallic pin which is formed projecting from the associated circuit board. The term "region" here refers in particular to the projection surface of the motor block on the first circuit board in the direction of the motor axis of the associated electric motor.

At least one suppressor component of the electric motor is furthermore advantageously arranged on the second control unit according to the disclosure, in particular directly on the circuit board there. An overall arrangement which can be mounted at particularly low-cost and in an installation space-saving manner is also possible in this manner. A cover of the motor block can furthermore also advantageously simultaneously be realized with the second control unit, as a result of which the number of components can still be kept small.

An electric plug connection is preferably also arranged on the second control unit according to the disclosure, in particular laterally next to the region of the motor block. The plug connection serves to connect an electric plug externally to the second control unit and thus to the entire hydraulic assembly. The hydraulic assembly is electrically connected to the rest of the vehicle via the electrical plug connector. In particular, the drive power for the electric motor is also transmitted from the vehicle to the hydraulic assembly via the plug connection. Switch signal and sensor signals are also transmitted from and to the vehicle via the plug connection.

Moreover, a bearing of a motor shaft of the electric motor is advantageously simultaneously arranged on the second control unit. The bearing should preferably be integrated into a housing of the second control unit. An otherwise necessary separate support of the bearing in a motor housing can be omitted as a result.

The at least one power component of the second control unit according to the disclosure should as mentioned above preferably be cooled, which is possible according to the arrangement according to the disclosure in a particularly simple, operationally reliable and simultaneously low-cost manner, in that the power component is connected in a heat-conducting manner directly to the hydraulic block located beside it. The heat conduction is preferably produced by direct surface contact. A heat-conducting medium such as a heat-conducting paste can advantageously also be used. The hydraulic block of the hydraulic assembly according to the disclosure has a comparatively large mass and can thus absorb in particular short-term thermal inputs and buffer these. The hydraulic block is also regularly manufactured from aluminum which is known to represent a material which conducts heat very well.

The first control unit according to the disclosure is preferably arranged on that side of the hydraulic block which faces away from the motor block. Signal and/or control components are arranged in the second control unit, which signal and/or control components have significantly lower power consumption in comparison with the known power components. While the power consumption of power components is regularly more than 100 Ampere, in particular more than 200 Ampere, the power consumption of signal components is regularly below 5 Ampere, in particular below 2 Ampere. The electrohydraulic elements installed in the hydraulic block, in particular the hydraulic valves and pressure sensors arranged there, are advantageously actuated by the second control unit. A comparatively large flat surface is advantageously available for the second control unit on that side of the hydraulic block which faces away from the motor block and simultaneously this surface is located close to the hydraulic valves to be contacted of the hydraulic assembly.

A valve contact is therefore also preferably arranged on the second control unit, which valve contact serves to contact the at least one electric hydraulic valve.

An electric line connection which is guided in particular transversely through the hydraulic block is advantageously formed for connection or coupling of the two control units according to the disclosure.

In the case of conventional vehicle control systems, the single control unit is arranged with its control circuit board on that side of the hydraulic block or pump housing which is opposite the motor block. This requires complex contacting of the motor block. In particular a large-volume throughbore through the hydraulic block and comparatively long electrical lines are thus required for the drive motor. In particular balancing measures for thermal expansions as well as relatively large layout surfaces on the control circuit board for the comparatively thick and wide copper conductor paths are required. These lead in turn to an increased degree to power losses and the development of heat.

The arrangement according to the disclosure of the second control unit in the immediate vicinity of the electric motor in contrast ensures numerous advantages. The circuit board layout can thus be further optimized by a short electrical connection of the motor and advantageous position displacement of the various contacts. The power consumption and thus the performance of the motor can furthermore be significantly increased. A motor cover, a plug connection, electric brushes, a rotor sensor and suppressor components in the form of inductors or capacitors as well as a motor bearing can be formed as a structural unit with the second control unit. Together with the electric motor, the second control unit can create a structural unit which advantageously as such is to be preassembled, tested and delivered. The arrangement of the second control unit directly on the electric motor is preferably configured in a hermetically sealed and pretested housing. This housing can simultaneously be used for the arrangement of the electric motor and thus as a motor block housing.

The total volume or the installation space of the overall arrangement can here be configured to be just as big or even smaller than in the case of conventional hydraulic assemblies. In particular, the reduced space requirement according to the disclosure for supply lines and discharge lines of the electric motor not only leads to a reduction in costs, but at the same time also to an optimization of the size of the installation space.

BRIEF DESCRIPTION OF THE DRAWINGS

An exemplary embodiment of the solution according to the disclosure is explained in greater detail below on the basis of the enclosed schematic drawings. In the drawings.

DETAILED DESCRIPTION

Figure 1:
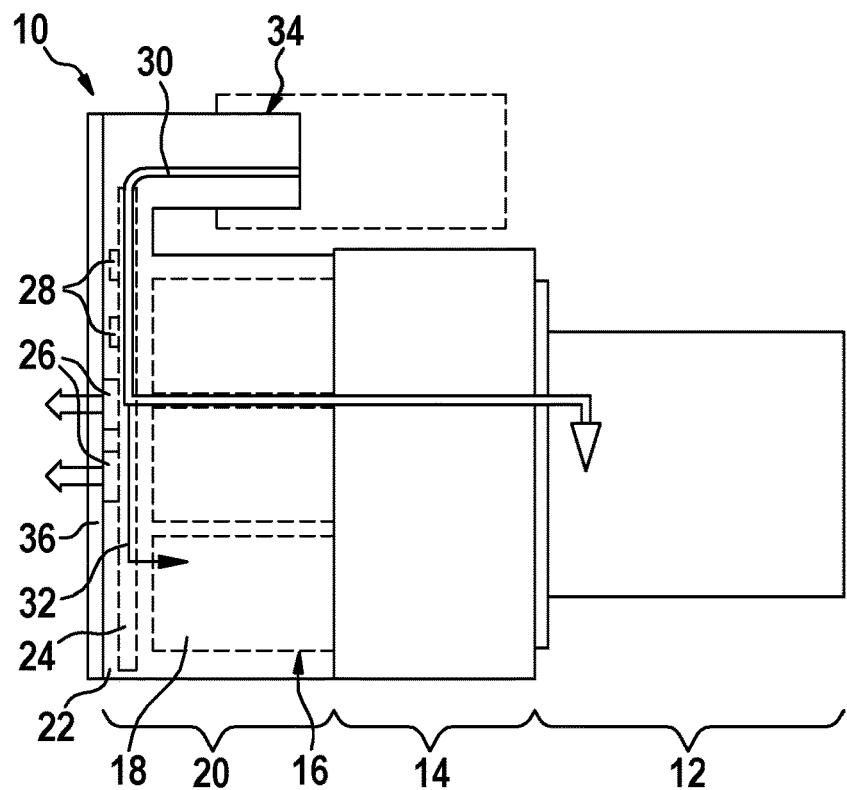
FIG. 1 shows a partially broken up side view of a hydraulic assembly according to the prior art.
Figure 2:
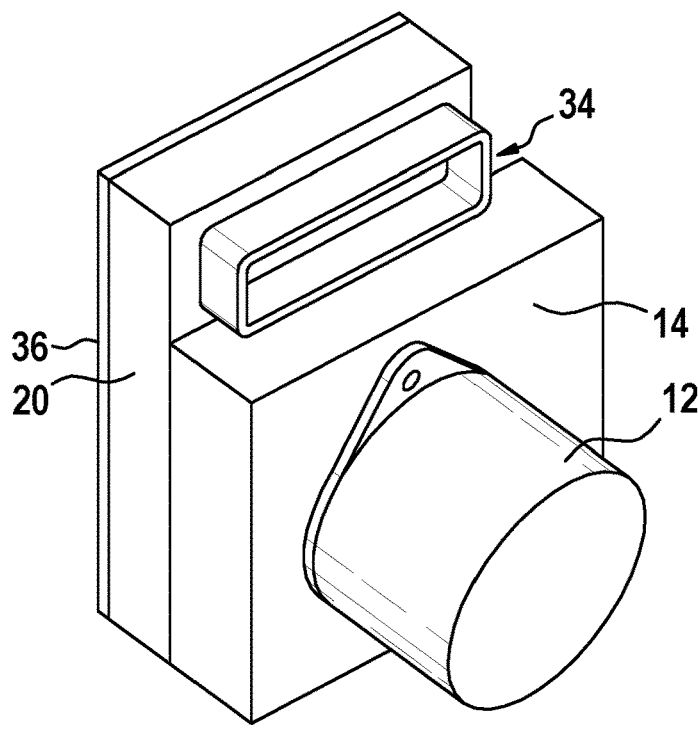
FIG. 2 shows a perspective representation of the hydraulic assembly according to FIG. 1.

A hydraulic assembly 10 according to the prior art with its cylindrical motor block 12 is represented in FIGS. 1 and 2. Motor block 12 is arranged on a side of a cube-shaped hydraulic block 14, on the opposite side of which cylindrical hydraulic valves 16 are located. Of hydraulic valves 16, their coils 18 can be seen outside hydraulic block 14. Said coils 18 of hydraulic valves 16 are part of a control apparatus in the form of a single control unit 20. They are covered by its control unit housing 22. A circuit carrier or a circuit board 24 in the form of a printed circuit board (PCB) is furthermore located inside control unit housing 22, wherein it then comes to bear against the side of coils 18 which face away from hydraulic block 14.

Various electronic components are arranged on circuit board 24, of which two power components 26 for motor actuation and two signal components 28 for solenoid valve actuation and microprocessor control are shown. Various conductor tracks are furthermore arranged there, of which a motor connection line 30 and a valve connection line 32 are shown.

A plug connection 34 which is provided with a multiplicity of plug contacts (not represented) which lead to a customer plug or cable harness (not represented) of an associated vehicle is furthermore located on control unit housing 22.

Motor connection line 30 thus also ends with one of its two ends at plug connection 34. The other end of motor connection line 30 is guided from circuit board 24 transversely through hydraulic block 14 to motor block 12 and ends there at an electric motor (not represented) of motor block 12.

In the case of hydraulic assembly 10 according to FIGS. 1 and 2, the construction is in need of improvement in two aspects under certain circumstances. On one hand, the heat is difficult to discharge at power components 26, wherein a cooling surface 36 in the form of a metal cover must where applicable be provided for this. On the other hand, the cabling and the thermal discharge at motor connection line 30, through which comparatively large electrical powers are transmitted, is complex.

Figure 3:
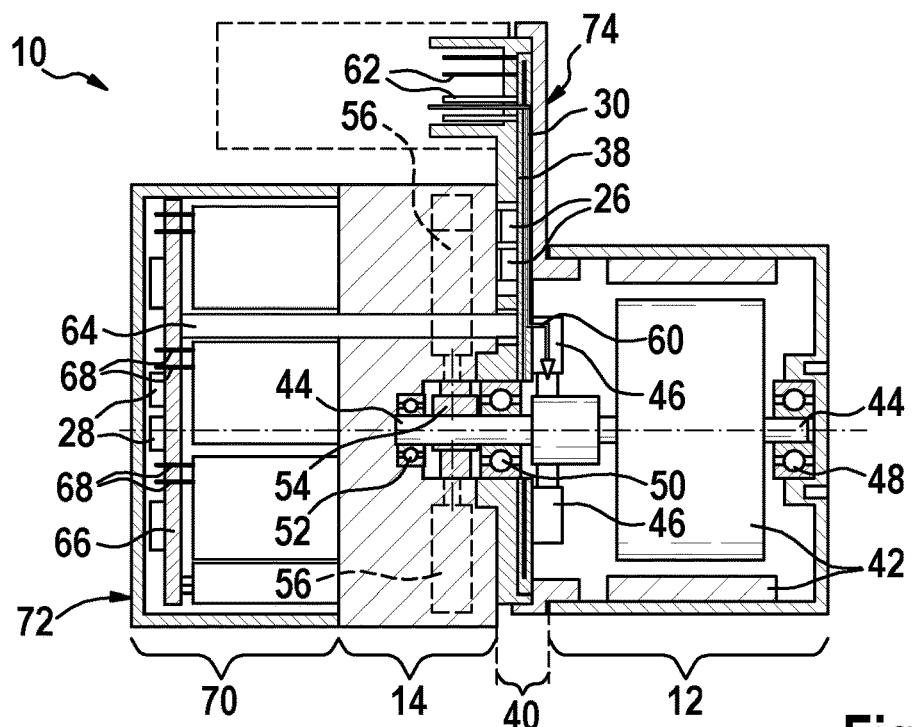
FIG. 3 shows a partially broken up side view of a hydraulic assembly according to the disclosure and FIG. 4 shows a perspective exploded representation of the hydraulic assembly according to FIG. 3.
Figure 4:
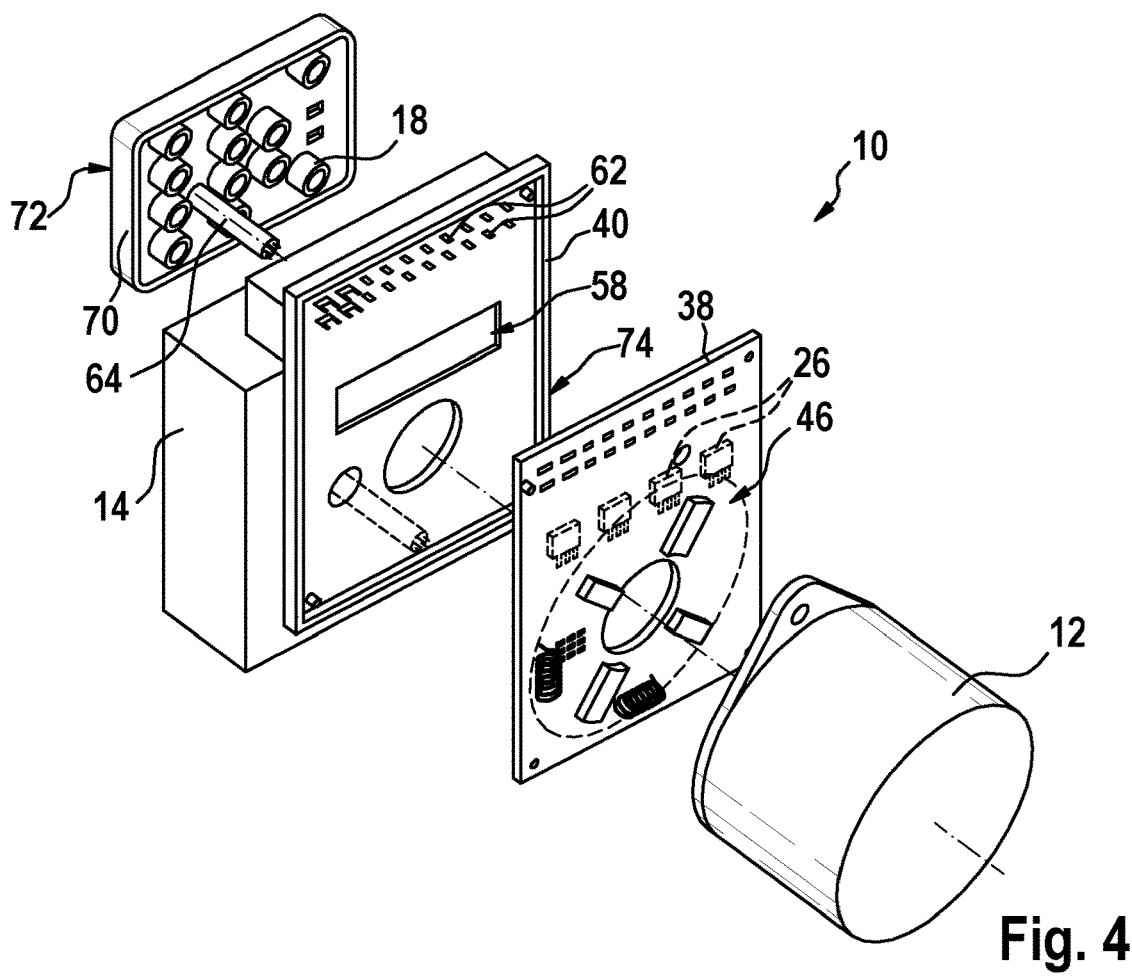

An exemplary embodiment of a hydraulic assembly 10 according to the disclosure is illustrated in FIGS. 2 and 3, in the case of which hydraulic assembly 10, in a first control unit 72, a first circuit board 66 is arranged on that side of hydraulic block 14 which faces away from motor block 12. A second control unit 74 with a second circuit board 38 is furthermore provided between motor block 12 and hydraulic block 14. The control apparatus configured in such a manner with two control units 72 and 74 according to FIGS. 3 and 4 is therefore so-to-say divided in two in contrast to the control apparatus shown in FIGS. 1 and 2.

Second circuit board 38 is located in a comparatively thin, rectangular, largely plate-shaped second control unit housing 40 which has plug connection 34 on one of its four sides. Hydraulic bock 14 bears against one of the two front sides of the plate form and against the other front side of motor block 12 with electric motor 42 installed therein. A motor shaft 44 which belongs to electric motor 42 penetrates through second circuit board 38 and thus projects into hydraulic block 14. At least one motor component 46, for example, in the form of four brushes, several inductors, several capacitors and/or a motor sensor is arranged on second circuit board 38. Circuit board 38 can thus take on the function of a brush holder. The motor sensor is used in particular when the electric motor is an EC motor.

Motor shaft 44 is mounted rotatably by means of three ball bearings of which a first motor bearing 48 is attached to the inside on the housing of motor block 14, a second motor bearing 50 is incorporated in a stationary manner, in particular injected, in second control unit housing 40 and third motor bearing 52 is inserted on the inside into hydraulic block 14.

Inside hydraulic block 14, an eccentric 54 is furthermore pushed on motor shaft 44, by means of which eccentric 54 several hydraulic pumps 56 located next to it are to be driven.

Power components 26 for associated electric motor 42 are furthermore located on second circuit board 38. Circuit board 38 conducts the comparatively high currents for the actuation of electric motor 42 by means of thick copper conductor tracks. Power components 26 are cooled by direct contact with hydraulic block 14. A heat-conducting material in the form of Thermal Interface Material (TIM) is arranged between power components 26 and hydraulic block 14. For this purpose, a correspondingly formed recess in the form of a through-opening 58 is formed in second control unit housing 40 for power components 26. The power loss of power components 26 can thus be transmitted in the form of heat directly to metallic hydraulic block 14. As a result of this, optimum heat discharge is achieved.

Moreover, motor connection line 30 is also guided as a high-current path from associated plug connection 34 by means of thick copper conductor tracks on second circuit board 38 to electric motor 42. A particularly short cableway is realized in this case. Electric motor 42 is contacted by means of several motor contacts 60 which are located directly on second circuit board 38. Motor connection line 30 begins at plug contacts 62 which extend beyond second circuit board 38 into motor block 14.

A line connection 64 for control and signal lines is guided from second circuit board 38 transversely through hydraulic block 14 to first circuit board 66. Alternatively, line connection 64 can also be formed next to hydraulic block 14. First circuit board 66 is located in the case of hydraulic assembly 10 according to FIGS. 3 and 4 (just as in the case of hydraulic assembly 10 according to FIGS. 1 and 2) on coils 18 of hydraulic valves 16. Exclusively signal components 28, i.e. those electric and electronic components which only conduct comparatively small electric currents and therefore exhibit comparatively little development of heat, are located on first circuit board 66. These components serve the purpose of valve control, sensor control and operate as microcontrollers. They furthermore serve as a connection to a signal and bus system (CAN). For this purpose, comparatively thin copper conductor tracks as well as valve contacts 68, by means of which adjacent coils 18 of hydraulic valves 16 should be contacted on the shortest path, are located on first circuit board 66.

First circuit board 66 is surrounded by a first control unit housing 70 with which coils 18 of hydraulic valves 16 which belong to hydraulic assembly 10 according to FIGS. 3 and 4 are also covered. First control unit housing 70 is exchangeably fitted on hydraulic block 14. A cooling surface 36 is not necessary on such a first control unit housing 70.

The invention claimed is:

1. A hydraulic assembly of a traction control system of a hydraulic vehicle brake system of a vehicle, comprising:
a hydraulic block in which at least one electric hydraulic valve and at least one electric hydraulic pump are arranged;
a motor block in which an electric motor configured to drive the at least one hydraulic pump is arranged; and
a control apparatus configured to control the at least one hydraulic valve, the at least one hydraulic pump, and the electric motor, the control apparatus configured with two structurally separate control units, which include a first control unit with signal components and a second control unit with power components for powering the electric motor,
wherein the second control unit is arranged between the motor block and the hydraulic block, and
wherein a plug connection is arranged on the second control unit, the plug connection configured to externally electrically connect the second control unit to the vehicle on which the hydraulic assembly is installed.

2. The hydraulic assembly as claimed in claim 1, wherein at least one brush of the electric motor is arranged in the second control unit.

3. The hydraulic assembly as claimed in claim 2, wherein the at least one brush is arranged in the second control unit directly on a circuit board.

4. The hydraulic assembly as claimed in claim 1, wherein at least one suppressor component of the electric motor is arranged in the second control unit.

5. The hydraulic assembly as claimed in claim 4, wherein the at least one suppressor component is arranged in the second control unit on a circuit board.

6. The hydraulic assembly as claimed in claim 1, wherein a cover of the motor block is simultaneously formed with the second control unit.

7. The hydraulic assembly as claimed in claim 1, wherein the second control unit is connected to the motor block to define a separately mountable structural unit.

8. The hydraulic assembly as claimed in claim 1, wherein a bearing of a motor shaft of the electric motor is arranged in the second control unit.

9. The hydraulic assembly as claimed in claim 1, wherein at least one power component is coupled onto the hydraulic block in a directly heat-conducting manner in the second control unit.

10. The hydraulic assembly as claimed in claim 1, wherein the first control unit is arranged on a side of the hydraulic block that faces away from the motor block.

11. The hydraulic assembly as claimed in claim 1, wherein the plug connection is configured to receive drive power for the electric motor.

12. The hydraulic assembly as claimed in claim 11, wherein the plug connection is further configured for transmission of switch and sensor signals to and from the vehicle.

13. The hydraulic assembly as claimed in claim 1, wherein the plug connection is arranged externally on the hydraulic assembly.

\* \* \* \* \*